United States Patent [19]

Sasaki et al.

[11] Patent Number: 5,561,419
[45] Date of Patent: Oct. 1, 1996

[54] WIRELESS COMMUNICATION APPARATUS AND GAME MACHINE USING THE SAME

[75] Inventors: Yuzuru Sasaki; Noboru Shiina; Kuniharu Itoh, all of Tokyo; Akio Sakai, Toyonaka, all of Japan

[73] Assignees: Nippon Steel Corporation, Tokyo; Capcom Co. Ltd., Osaka, both of Japan

[21] Appl. No.: 590,109

[22] Filed: Jan. 19, 1996

Related U.S. Application Data

[63] Continuation of Ser. No. 86,083, Jul. 6, 1993, abandoned.

[30] Foreign Application Priority Data

Jul. 7, 1992 [DE] Germany ............................... 4-203022

[51] Int. Cl.$^6$ ........................................................ G05B 23/02
[52] U.S. Cl. ............................ 340/825.08; 340/825.07
[58] Field of Search .......................... 340/825.06, 825.07, 340/825.08, 825.24, 323 R; 345/157, 169; 348/734; 273/438

[56] References Cited

U.S. PATENT DOCUMENTS

| | | | |
|---|---|---|---|
| 4,466,001 | 8/1984 | Moore et al. | 340/825.08 |
| 4,477,809 | 10/1984 | Bose | 340/825.07 |
| 4,604,618 | 8/1986 | Akiba et al. | 340/825.07 |
| 4,870,389 | 9/1989 | Ishiwata et al. | 340/709 |
| 4,962,368 | 10/1990 | Dobrzanski et al. | 340/825.08 |
| 5,150,114 | 9/1992 | Johansson | 340/825.08 |
| 5,369,516 | 11/1994 | Uchida | 340/825.08 |

Primary Examiner—Victor R. Kostak
Assistant Examiner—John W. Miller
Attorney, Agent, or Firm—Law Offices of Pollack, Vande Sande & Priddy

[57] ABSTRACT

A wireless communication apparatus for transmitting signals between a plurality of controllers and a master unit in a wireless fashion and a game machine using the wireless communication apparatus are disclosed, wherein different delay times are set for the respective controllers, each of the controllers comprises a first receiver for receiving a reference time signal from the master unit, an input device for inputting an operating signal by a user and a first transmitter for transmitting the operating signal to the master unit at the delay time set for the controller after receiving the reference time signal and the master unit comprises a reference time signal generator for repeatedly generating the reference time signal, a second transmitter for transmitting the reference time signal to each controller, a second receiver for receiving the operating signal transmitted from each of the controllers and a discriminator for taking out output signals from the signals received by the second receiver, respectively, at every timings corresponding to the delay times set for the controllers, respectively.

10 Claims, 5 Drawing Sheets

IN CASE THE MASK LENGTH IS 8 BITS, EACH BIT HAS DATA (ASSOCIATED WITH A KEY)

TO MASTER UNITS

WIRELESS COMMUNICATION APPARATUS AND GAME MACHINE USING THE SAME

This application is a continuation of U.S. patent application Ser. No. 08/086,083, filed Jul. 6, 1993 now abandoned.

BACKGROUND OF THE INVENTION

1. Field of the Invention

The present invention relates to wireless communication apparatuses using infrared rays, for example. In particular, the present invention relates to a wireless communication apparatus for use with a system in which a plurality of controllers transmit data signals to a master unit and the master unit can receive selectively data signals transmitted from the controllers, and relates to a game machine using such a wireless communication apparatus.

2. Description of the Related Art

In conventional game machines, for example, as disclosed in U.S. Pat. No. 4,870,389, an operating device employs wireless communication utilizing infrared rays for transmission of operating signals of the controller in the same way as a remote controller of the television set and the like. The operating signals are sent to the master unit in one-way communication. According to this method, the master unit is in asynchronism with the controllers. In general, the master unit introduces operating signals into the game machine main body periodically at a fixed period of cycles based upon the period of display cycles on the game screen.

In the operating device of the above described conventional game machine using wireless communication, however, transmission (or reception) of signals from each of the controllers to the master unit is in asynchronism with the master unit. Therefore, butting or conflicts among signals occur. Furthermore, the master unit has no means for recognizing which controller has transmitted the received signal. Therefore, it is not possible to play a game by a plurality of users using respective controllers. That is to say, it does not allow a plurality of members to play a game.

SUMMARY OF THE INVENTION

In view of the above described circumstances, the present invention has been made. An object of the present invention is to provide a wireless communication apparatus by using a plurality of controllers in wireless communication and provide a game machine using such a wireless communication apparatus, by transmitting a reference signal for synchronization from the master unit to the controllers, allowing each controller to transmit an operating signal having data at a delay time from the reference signal and to continue the transmission for a predetermined time so that the operating signals are transmitted from a plurality of controllers in a time division fashion.

Another object of the present invention is to provide a wireless communication apparatus by using a plurality of controllers, by transmitting a signal for synchronization from the master unit to the controllers, and allowing each controller to set a delay time from the signal until beginning of transmission of data and a duration time of transmission.

In order to achieve the above described objects, according to the present invention, a wireless communication apparatus for transmitting signals in a wireless fashion between a plurality of controllers and a master unit is so configured that each controller includes a first receiver for receiving a reference timing signal from the master unit, input means for inputting an operating signal by a user, and a first transmitter for transmitting the operating signal inputted by the input means at a predetermined delay time specific to the controller from the reference timing signal. The disclosed apparatus further comprises the master unit which includes a reference timing signal generator for repeatedly generating the reference timing signal, a second transmitter for transmitting the reference timing signal toward the controllers, a second receiver for receiving the operating signals transmitted from the controllers, and a discriminator for selecting a signal from the signals received by the second receiver, at a timing corresponding to the delay time determined for each controller. The wireless communication apparatus further includes delay time setting means provided to each controller to set the delay time. Furthermore, the communication between the master unit and the controllers is carried out by using infrared rays. The wireless communication apparatus further includes a plurality of storage means for storing an output of the discriminator. (The storage means are respectively assigned to the controllers on the basis of the delay time.)

According to the present invention, a game machine is arranged such that signals are transmitted between a plurality of controllers and a master unit in a wireless fashion. An operating signal inputted from input means in each controller by a user is transmitted to the master unit so that a game program is executed based on the signal, wherein the master unit includes a reference timing signal generator for repeatedly generating a reference timing signal, a second transmitter for transmitting the reference timing signal toward the controllers, a second receiver for receiving the operating signal transmitted from each of the controllers, and a discriminator for selecting a signal from the signals received by the second receiver at a timing corresponding to a delay time set by each of the controllers. Each of the controllers includes a first receiver for receiving the reference timing signal from the master unit, input means for inputting an operating signal by a user, and a first transmitter for transmitting the operating signal inputted by the input means, at a timing delayed by the controller from the reference timing signal. The game machine further includes delay time setting means provided to each controller to set the delay time. Furthermore, the communication between the master unit and each controller is conducted by using infrared rays. Furthermore, the game machine further includes a plurality of storage means for storing an output of the discriminator. (The storage means are respectively assigned to the controllers on the basis of the delay time.)

In the above arrangement of the present invention, after the wireless communication apparatus is connected to the game machine main body, the master unit generates repeatedly a reference signal for providing a standard time point for signal transmission and reception. Each controller initiates transmission of the operating signal to the master unit at the time delay set by the controller after receiving the reference signal and continues the transmission for a predetermined time interval. In this manner, the operating signals are transmitted from the controllers to the master unit in a time division fashion. Therefore the master unit can discriminate serial data transmitted from a plurality of the controllers so that the plurality of the controllers can play the game machine.

Furthermore, since the signals are transmitted from a plurality of controllers in a wireless communication channel in a time division fashion and the master unit can discriminate the signals of each controller, a plurality of controllers can operate the same machine without conflicts among them.

In the game machine using the above-mentioned wireless communication apparatus, a game can be played simultaneously by a plurality of players (users) without conflicts among them.

DESCRIPTION OF THE PREFERRED EMBODIMENTS

Figure 1:
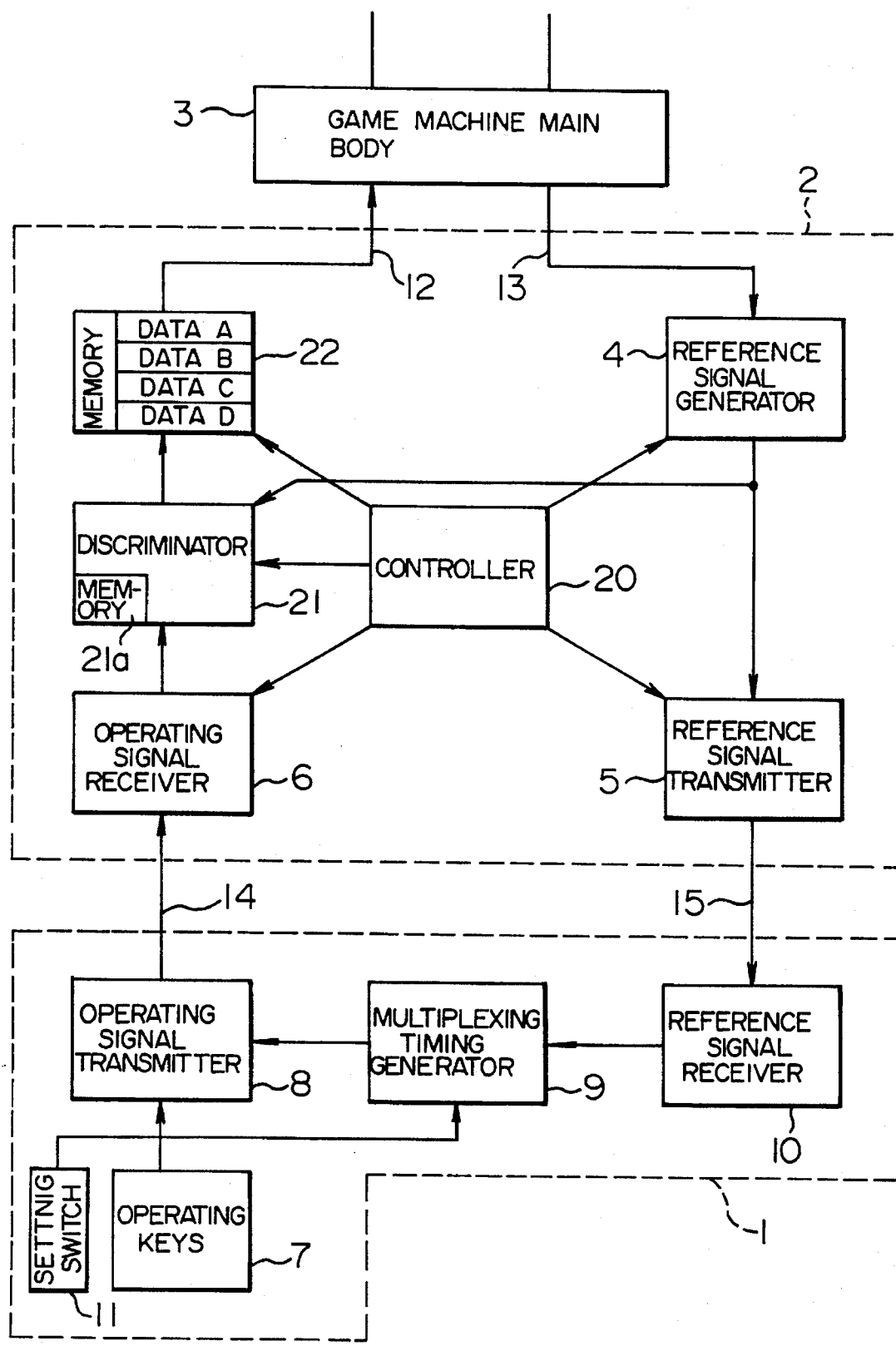
FIG. 1 is a block diagram showing a wireless communication apparatus according to one embodiment of the present invention.

An embodiment of the present invention will hereafter be described by referring to the drawings.

Figure 2:
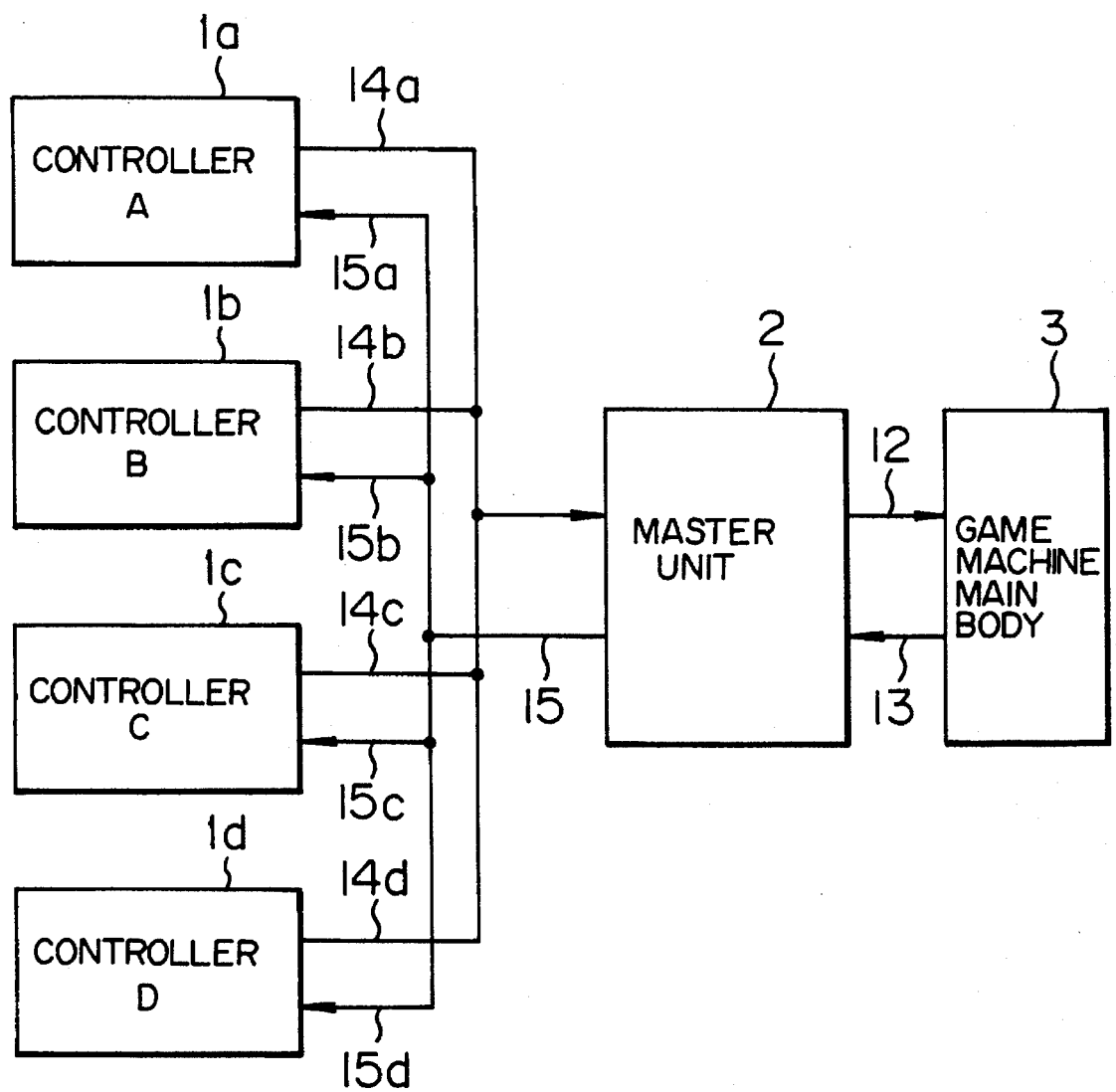
FIG. 2 is a block diagram showing the relation between four controllers and a single master unit.
Figure 4A:
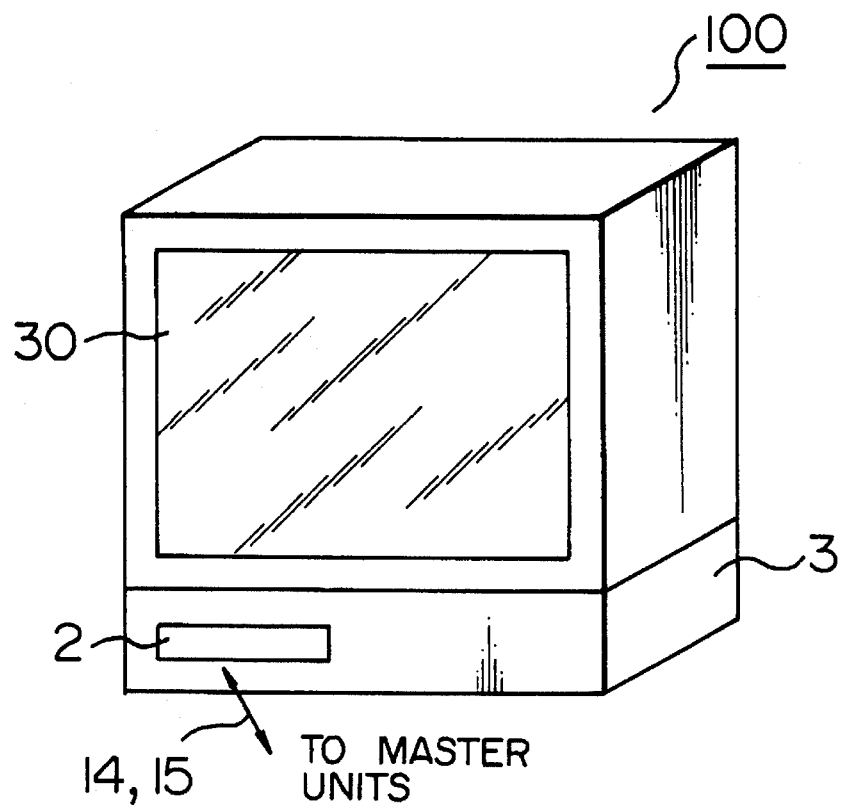
FIGS. 4A and 4B are diagrams showing an outer appearance of a main body and one of the controllers of a game machine according to the present invention.
Figure 4B:
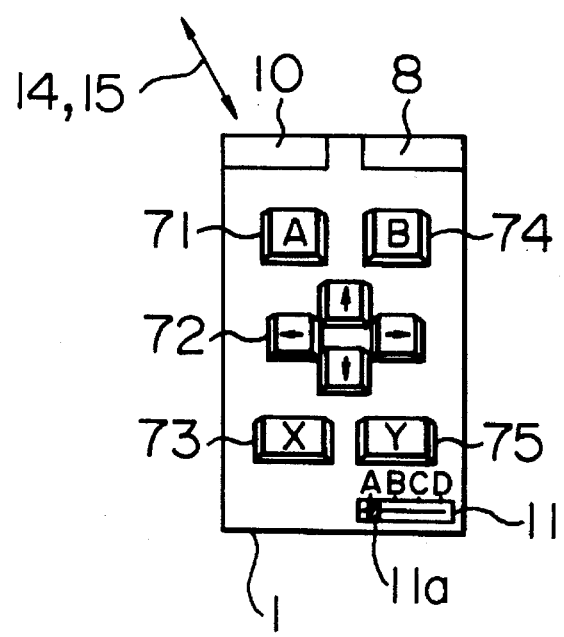

First of all, the configuration of a game machine according to the present invention will be described. Referring to FIGS. 4A and 4B, a game machine 100 includes a game machine main body 3 having monitor 30 such as a home TV receiver, a master unit 2, and a plurality of controllers 1 one of which is shown in FIG. 4B. Information is exchanged between the master unit 2 and each controller 1 by wireless communication 14 and 15 using infrared rays. The controller 1 has a receiver 10 for receiving a signal transmitted from the master unit 2, a transmitter 8 for transmitting a signal to the master unit 2, operation keys 7 for inputting data by a user or player and a setting switch 11 for setting a delay time. The setting switch 11 includes a slide key 11a which is slidably mounted to the switch 11 so that four predetermined different time delays $\Delta ta$, $\Delta tb$, $\Delta tc$ and $\Delta td$ can be set by moving the key to the channels A, B, C and D, respectively. As mentioned hereinafter, the channels A, B, C and D represent the channels allotted to the respective controllers in transmission of data in a time division fashion. For example, data for instructing movement directions and actions of a character allotted to each user or player in a given game can be inputted by the keys. The operation keys 7 of FIG. 4B include function keys 71 and 74 for causing action such as running or shooting, a direction instructing key 72, a start key 73 for starting a game, and a select key 75 for selecting the kind of a game. FIG. 2 is a block diagram of the game machine 100. Furthermore, FIG. 1 shows details of this block diagram. In case there are four users or controllers as shown in FIG. 2, for example, information is exchanged between the controllers 1a, 1b, 1c and 1d and the master unit 2 by wireless communication 14a, 14b, 14c, 14d, 15a, 15b, 15c and 15d using infrared rays. The predetermined different delay times are preliminarily stored in a memory 21a provided to the discriminator 21 of the master unit 2 to prevent data of the respective controllers from butting or conflicts.

All the delay times for the respective controllers may be set by a setting unit provided to the master unit 2. In this case, each of the delay times is transmitted to the corresponding controller and stored in a memory provided to the controller. Depending on the game program, the game characters allotted to the respective controllers or players can be changed by changing the setting of the channels by the respective setting switches. Furthermore, depending upon the setting, a plurality of players can operate the same character so long as data conflicts are not caused.

As shown in FIG. 1, the master unit 2 includes a reference signal generator 4, a reference signal transmitter 5, an operating signal receiver 6, a discriminator 21, a memory 22, and a controller 20. A game machine output signal 13 (depending upon application of each game) transmitted from the game machine main body 3 to the reference signal generator 4 of the master unit 2 is converted to a reference signal. This reference signal is transmitted from the reference signal transmitter 5 to the controller 1. An operating signal transmitted from each controller 1 is received by the operating signal receiver 6, discriminated by the discriminator 21, temporarily stored in an area of the memory 22 allotted to the controller, and sent to the game machine main body 3. These operations are controlled by the controller 20.

Figure 5:
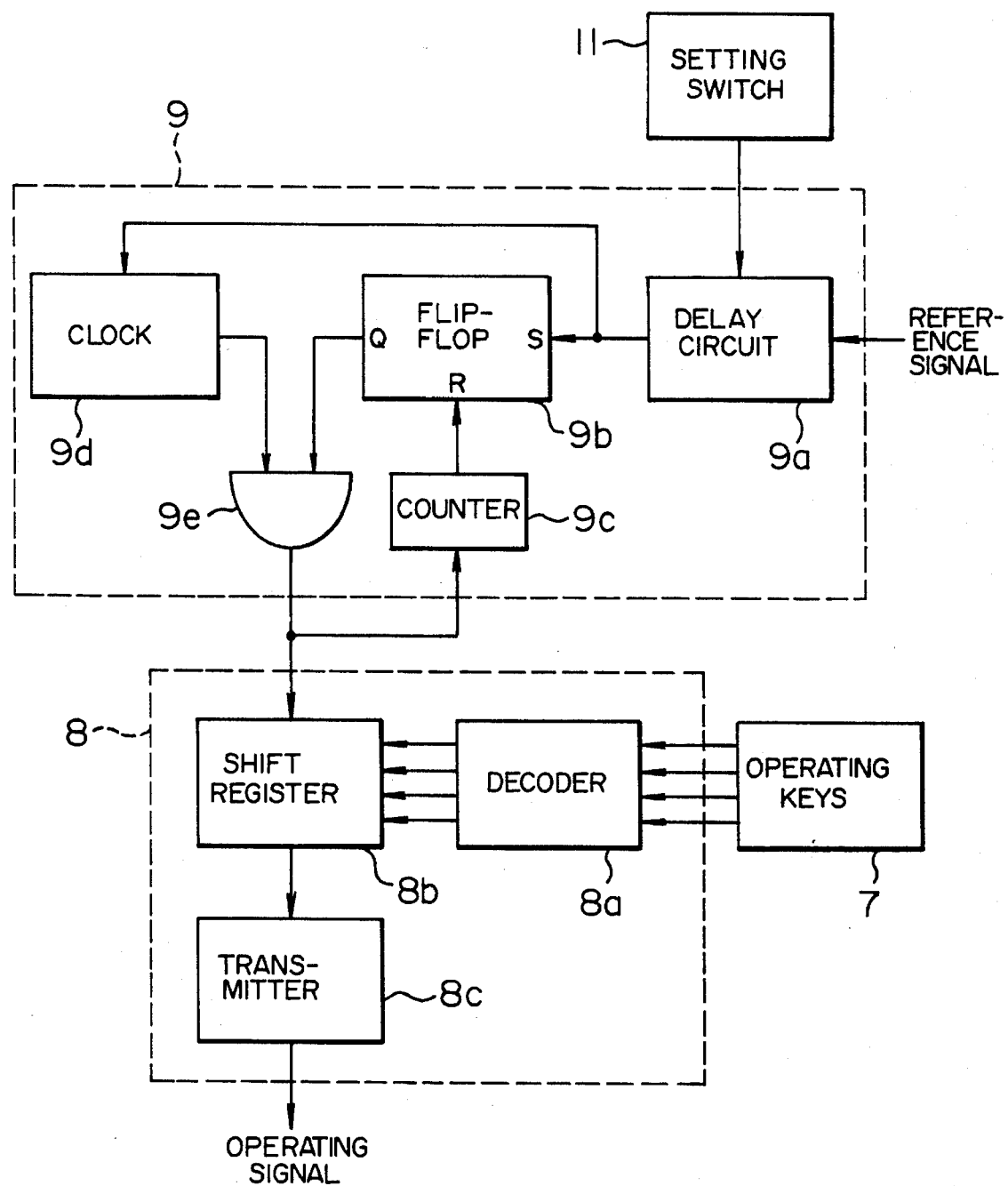
FIG. 5 is a block diagram showing the operation of each controller.

As shown in FIG. 1, each controller 1 includes a reference signal receiver 10, a multiplexing timing generator 9, the setting switch 11, operating keys 7, and an operating signal transmitter 8. As shown in FIG. 5, the multiplexing timing generator 9 includes a delay circuit 9a for delaying a signal supplied from the reference signal receiver 10 by a time set by the setting switch 11 and sending the delayed signal to an AND circuit 9e through a flip-flop circuit 9b and a clock generator 9d, respectively, and a counter 9c which receives the output of the AND circuit 9e. Operation of the circuit shown in FIG. 5 will be described later.

Operation conducted when the game machine is used (in case there are four users, for example) will now be described.

As shown in FIG. 4A, the game machine of the present invention includes the game machine main body 3 having a monitor 30 for displaying images, a plurality of, say, four controllers 1, and the master unit 2 for discriminating data supplied from respective controllers 1 and transmitting data to the game machine main body 3. Information is exchanged between the controllers 1 and the master unit 2 by wireless communication using infrared rays.

In the game machine of this embodiment, data signals inputted by users are transmitted to the master unit in a time division fashion in order to permit operations by a plurality of users on wireless communication channels. The master unit 2 determines the correspondence between the operating signal included in serial data and the controller from which the operating signal is transmitted and transmits the operating signals to the game machine main body. Its procedure will hereafter be described.

(0) The game machine main body recognizes the users. Delay times are set in respective controllers of the four users to $\Delta ta$, $\Delta tb$, $\Delta tc$ and $\Delta td$ (ms), respectively.

(1) The transmission command (game machine output signal) 13 is outputted depending upon the application of the game machine main body 3 from the game machine main body 3 to the master unit 2. The game machine output signal is a signal enabling game operation and produced, for example, when power is supplied to the game machine main body 3. Alternatively, the game machine output signal may be produced at a timing determined by the game being played.

(2) In response to the transmission command (game machine output signal), the reference signal generator 4 starts generating repeatedly, preferably periodically at a predetermined period of time, the reference signal, which is sent simultaneously to the reference signal transmitter 5 and the discriminator 21.

The reference signal transmitter 5 converts this reference signal to an infrared ray reference signal and transmits the infrared ray reference signal to respective controllers 1 via the reference signal transmission channel 15.

The reference signal transmission channel 15 is a wireless communication channel using infrared rays.

(3) The reference signal received by the reference signal receiver 10 of the controller 1 is sent to the multiplexing timing generator 9.

As shown in FIG. 5, the multiplexing timing generator 9 includes the delay circuit 9a for delaying the signal supplied from the reference signal receiver 10 by the delay time set by the setting switch 11 and sending the delayed signal to both the flip-flop circuit 9b and the clock generator 9d. The outputs of the flip-flop circuit 9b and the clock generator 9d are applied to the inputs of the AND circuit 9e, and the output of the AND circuit 9e is supplied to the counter 9c.

By setting switch 11, the delay time specific to each of the controllers 1 is set.

Figure 3A:
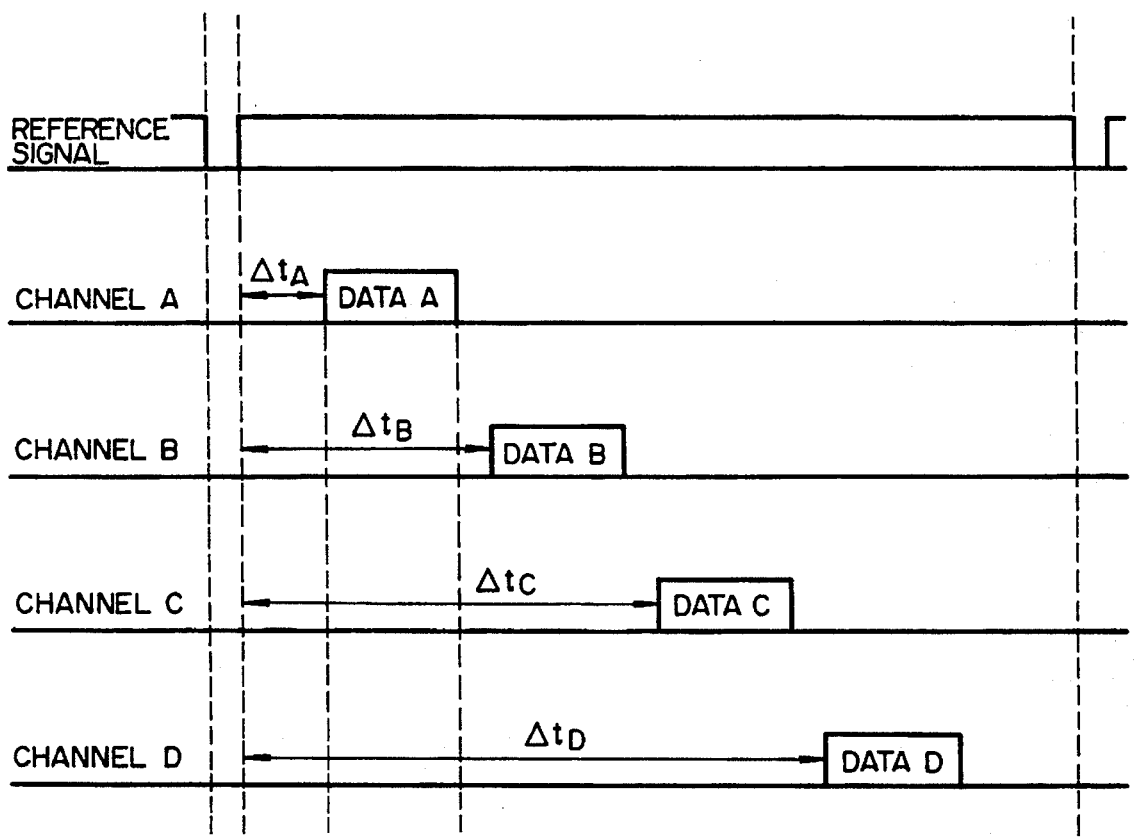
FIGS. 3A, 3B and 3C are timing charts for explaining the operation of the apparatus shown in FIG. 2.

FIG. 3A shows relationship between the delay times and transmission timings in the respective controllers.

The delay times are preset for transmitting the signals in a time division fashion. The delay times of the respective controllers (assumed to be four controllers A, B, C and D) are Δta, Δtb, Δtc and Δtd (ms), respectively. In case of the controller A, therefore, the delay time from reception of the reference signal is set by the setting switch 11 of the controller to Δta (ms). When Δta (ms) has elapsed after the reception of the reference signal by the reference signal receiver 10, the controller A is allowed to initiate the transmission. After elapse of these delay times, the individual controllers initiate transmission of data.

The reference signal is delayed by the delay circuit 9a of FIG. 5, and the delayed reference signal is inputted to a Set: terminal of the flip-flop circuit 9b. At this point, the flip-flop circuit outputs a high level signal to the AND gate 9e.

At the same time, the delayed reference signal 9a is supplied to the clock generator 9d. A clock signal is outputted at the leading edge of the reference signal from the clock generator 9d.

The output of the AND circuit 9e, i.e., clock pulses of the clock signal, are counted by the counter 9c. When a preset count is reached, a reset signal is produced from the counter 9c and applied to a Reset terminal of the flip-flop circuit 9b so that the output of the flip-flop circuit 9b becomes a low level signal.

Figure 3B:
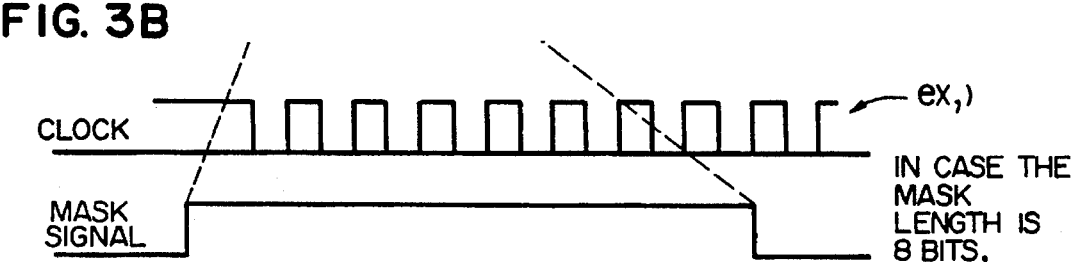

That is to say, the output of the flip-flop circuit 9b is at the high level during a time length corresponding to the preset count in the counter 9c to be used as a mask signal as shown in FIG. 3B. Only when the mask signal is present, this controller is allowed to transmit data to the master unit 2 as shown in FIG. 3A.

The operating signal transmitter 8 includes a decoder 8a for decoding data of the operating keys 7, the setting switch 11, a shift register 8b, and a transmitter 8c. The data corresponding to the depressed operating key 7 is decoded into a transmission signal pattern of bits by the decoder 8a. The bits of the decoded signal are set in the shift register 8b. In accordance with the clock signal from the AND circuit 9e, the bits are sequentially sent from the shift register 8b to the transmitter 8c, and transmitted from the transmitter 8c to the master unit 2.

The clock signal is outputted from the AND circuit 9e only when the mask signal of high level is present. Only during this interval, signals are transmitted from the transmitter 8c. By setting the timing at which the mask signal is high differently for each controller, the transmission data of the respective controllers are prevented from butting or conflict.

The data corresponding to the depressed key 7 is decoded, inputted to the shift register 8b, sent to the transmitter 8c, and transmitted to the master unit 2 as shown in FIG. 3B.

Figure 3C:
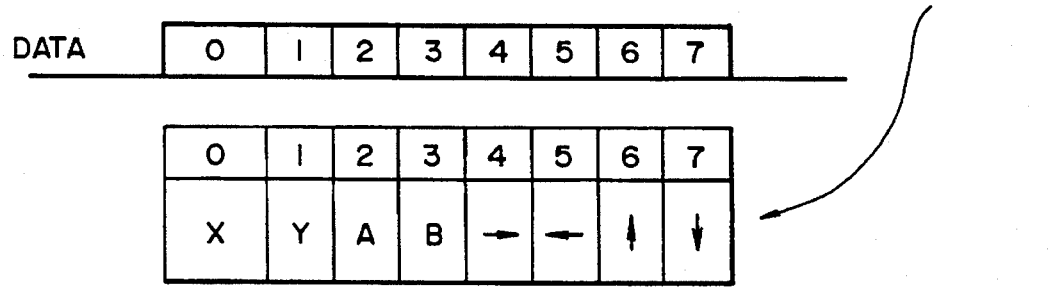

For example, in case the data length is 8 bits, a mask signal corresponding to 8 bits is generated in the multiplexing timing generator 9. As shown in FIG. 3C, 8 bits are allotted to the respective operating keys 7. By depressing one of the operating keys 7, the bit allotted to the depressed key is turned on to generate a binary signal "1".

When the key "X" is selected (depressed), bit "0" is turned on.

When the key "Y" is selected (depressed), bit "1" is turned on.

When the key "A" is selected (depressed), bit "2" is turned on.

When the key "B" is selected (depressed), bit "3" is turned on.

When the key "←" is selected (depressed), bit "4" is turned on.

When the key "→" is selected (depressed), bit "5" is turned on.

When the key "↑" is selected (depressed), bit 6 is turned on.

When the key "↓" is selected (depressed), bit 7 is turned on.

(4) The operating signal is transmitted from the operating signal transmitter 8 to the master unit 2 via the operating signal transmission channel 14, received by the operating signal receiver 6, and sent to the discriminator 21.

The operation signal transmission channel 14 is wireless communication channel using infrared rays. For the four controllers, four channels A, B, C and D are allotted to the controllers A, B, C and D, respectively, in an order of the time delays Δta, Δtb, Δtc and Δtd from a shortest one to a longest one as set by the respective controllers.

(5) On the basis of the reference signal sent to the discriminator 21 in (2) and the delay times of the respective controllers stored in the memory 21a, the discriminator 21 determines the operation signal received at Δta (ms) after the reference signal as the one which is transmitted from the controller A, the operation signal received at Δtb (ms) after the reference signal as the one which is transmitted from the controller B, the operation signal received at Δtc (ms) after the reference signal as the one which is transmitted from the controller C and the operation signal received at Δtd (ms) after the reference signal as the one which is transmitted from the controller D.

(6) The operation signals are transmitted from the respective controllers in a form of serial bits and stored in the respective areas of the memory 22 allotted to the channels A, B, C and D, respectively, as data A, B, C and D.

(7) The stored data A, B, C and D are converted to electric signals and transferred to the game machine main body 3 as operating data output 12.

The steps (1) to (7) are conducted every frame of the game, and the game proceeds. In general, several tens frames are set per second.

The present invention is not limited to the above described embodiment. On the basis of the technical thought of the present invention, various effective changes and applications are possible. For example, the data length, the number of controllers or players and operation keys are not limited to those described above. Furthermore, wireless communication means is not limited to infrared rays, but various electromagnetic waves such as optical waves or microwaves may be used.

Furthermore, the reference signal is periodically fixed in the present invention. However, the reference signal is not limited to this, the reference signal may be indicative of information and but the operating mode can be changed depending on the information of the reference signal. For example, data associated with each operating data can be changed, or the delay time can be changed.

We claim:

1. A wireless communication apparatus for transmitting signals in a wireless form between a plurality of controllers and a master unit, said apparatus comprising means for setting different delay times for the controllers, respectively, such that a difference between the delay times set for any two of said controllers is no less than a predetermined time length, and wherein each of said controllers comprises:

first receiver means for receiving a reference timing signal from said master unit;

input means including a plurality of input keys for inputting an on-demand operating signal which comprises a plurality of bits responsive to activation of each input key, said input keys being allotted to specific functions, respectively, selectable by a user and said plurality of bits being associated with said input keys, respectively; and first transmitter means for transmitting an information signal having a predetermined duration time and representing the on-demand operating signal inputted by said input means at the delay time set for the controller after receiving said reference timing signal, said plurality of bits of said on-demand operating signal being transmitted bit-by-bit serially, and said duration time being no longer than said predetermined time length; and wherein said master unit comprises:

reference timing signal generator means for generating repeatedly said reference timing signal;

second transmitter means for transmitting said reference timing signal to each of said controllers;

second receiver means for receiving the information signal transmitted from each of said controllers; and discriminator means for selecting output signals from the information signals received by said second receiver means, at each of the timings corresponding to the delay times set for the respective controllers.

2. A wireless communication apparatus according to claim 1, wherein delay time setting means is provided to each of the controllers to set the delay time for the controller.

3. A wireless communication apparatus according to claim 1, wherein the transmission of the signals between said master unit and said controllers is conducted by using infrared rays.

4. A wireless communication apparatus according to claim 1, further comprising a plurality of storage means for storing the output signals of said discriminator means respectively, said storage means being respectively allotted to said controllers on the basis of said delay times.

5. A game machine, in which signals are transmitted in a wireless form between a plurality of controllers and a master unit, and a game program is carried out on the basis of an on-demand operating signal inputted by each of said plurality of controllers, said machine comprising means for setting different delay times for the controllers, such that a difference between the delay times set for any two of said controllers is no less than a predetermined time length, and wherein each of said controllers comprises:

first receiver means for receiving a reference timing signal from said master unit;

input means including a plurality of input keys for inputting on-demand operating signal which comprises a plurality of bits responsive to activation of each input key, said input keys being allotted to specific functions, respectively, to be carried out by said game machine, and said plurality of bits being associated with said input keys, respectively;

first transmitter means for transmitting an information signal having a predetermined duration time and representing the on-demand operating signal inputted by said input means at the delay time set for the controller after receiving said reference timing signal, said plurality of bits of said on-demand operating signal being transmitted bit-by-bit serially, and said duration time being not longer than said predetermined time length; and wherein said master unit comprises:

reference timing signal generator means for generating repeatedly said reference timing signal;

second transmitter means for transmitting said reference timing signal to each of said controller;

second receiver means for receiving the information signal transmitted from each of said controllers; and discriminator means for selecting output signals from the information signals received by said second receiver means, at each of the timings corresponding to the delay times, respectively, set for the controllers.

6. A game machine according to claim 5, wherein said different delay times are set by time setting means provided to said controllers, respectively.

7. A game machine according to claim 5, wherein the transmission of the signals between said master unit and said controllers is conducted by using infrared rays.

8. A game machine according to claim 5, further comprising a plurality of storage means for storing the output signals of said discriminator means, said storage means being respectively allotted to said controllers on the basis of said delay times.

9. A communication system for transmitting signals via a wireless medium, comprising:

a master unit which includes a reference timing signal generator means for generating a reference timing signal, first transmitter means for transmitting said reference timing signal, first receiver means for receiving a time delayed information signal, and discriminator means for identifying said time delayed information signal received by said first receiver means;

a plurality of controllers, wherein each controller includes second receiver means for receiving said reference timing signal from said master unit, input means including a plurality of input keys allotted to specific functions, respectively, selectable by a user for entering an on-demand operating signal which comprises a plurality of bits associated with said input keys, respectively, responsive to activation of each input key, second transmitter means for transmitting said time delayed information signal in direct response to said reference timing signal, said time delayed information signal representing said on-demand operating signal; and delay means for setting a different delay time for each controller in said plurality of controllers, wherein said delay time is individually set for each controller to delay transmitting said information signal in direct response to said reference timing signal, and wherein a difference between two successive delay times may vary between pairs of adjacent controllers and is not less than time duration of said information signal to prevent conflict among information signals of said plurality of controllers.

10. A game machine for transmitting signals via a wireless medium, comprising:

a game program responsive to an on-demand operating signal entered by a user;

a master unit which includes a reference timing signal generator means for generating a reference timing signal, first transmitter means for transmitting said reference timing signal, first receiver means for receiving a time delayed information signal, and discriminator means for identifying said time delayed information signal received by said first receiver means;

a plurality of controllers, wherein each controller includes second receiver means for receiving said reference timing signal from said master unit, input means including a plurality of input keys allotted to specific functions, respectively, to be carried out by said game machine for entering said on-demand operating signal which comprises a plurality of bits associated with said input keys, respectively, responsive to activation of each input key, second transmitter means for transmitting said time delayed information signal in direct response to said reference timing signal, said time delayed information signal representing said on-demand operating signal; and delay means for setting a different delay time for each controller in said plurality of controllers, wherein said delay the is individually set for each controller to delay transmitting said information signal in direct response to said reference timing signal, and wherein a difference between two successive delay times may vary between pairs of adjacent controllers and is not less than time duration of said information signal to prevent conflict among information signals of said plurality of controllers.

\* \* \* \* \*